(12) United States Patent
Tajer

(10) Patent No.: US 9,948,075 B2
(45) Date of Patent: Apr. 17, 2018

(54) CABLE CONDUIT SHAPE HOLDER DEVICE AND METHOD

(71) Applicant: Ronen Tajer, Tel Aviv (IL)

(72) Inventor: Ronen Tajer, Tel Aviv (IL)

(73) Assignee: Oren Almog, Tel Aviv (IL), part interest ( * ) Notice: Subject to any disclaimer, the term of this patent is extended or adjusted under 35 U.S.C. 154(b) by 0 days.

(21) Appl. No.: 14/687,923

(22) Filed: Apr. 16, 2015

(65) Prior Publication Data

US 2016/0305575 A1  Oct. 20, 2016

(51) Int. Cl.
  *F16L 3/12* (2006.01)
  *F16L 3/137* (2006.01)
  *F16L 5/00* (2006.01)
  *H02G 1/00* (2006.01)
  *H02G 3/04* (2006.01)

(52) U.S. Cl.
  CPC ............. *H02G 1/00* (2013.01); *H02G 3/0431* (2013.01)

(58) Field of Classification Search
  CPC .......... H02G 3/32; H02G 3/0434; H02G 1/00; Y10T 24/3444
  See application file for complete search history.

(56) References Cited

U.S. PATENT DOCUMENTS

| | | | | |
|---|---|---|---|---|
| 5,929,380 A * | 7/1999 | Carlson, Jr. | .......... | H02G 3/0431 138/115 |
| 6,134,370 A * | 10/2000 | Childers | .............. | G02B 6/4478 174/74 R |
| 6,885,805 B2 * | 4/2005 | Asada | .................. | H02G 3/0487 385/134 |
| 9,360,649 B2 * | 6/2016 | Chang | .................. | G02B 6/4478 |
| 2002/0150352 A1 * | 10/2002 | Ngo | ...................... | G02B 6/4478 385/86 |
| 2004/0120656 A1 * | 6/2004 | Banas | .................. | G02B 6/3887 385/86 |
| 2004/0121646 A1 * | 6/2004 | Iamartino | ............ | G02B 6/3829 439/445 |
| 2004/0136657 A1 * | 7/2004 | Ngo | ...................... | G02B 6/3887 385/86 |
| 2010/0247041 A1 * | 9/2010 | Szilagyi | ............... | G02B 6/3887 385/86 |
| 2011/0108150 A1 * | 5/2011 | Renaud | ...................... | F16L 3/06 138/118 |
| 2012/0269485 A1 * | 10/2012 | Haley | .................. | G02B 6/3887 385/78 |
| 2013/0270400 A1 * | 10/2013 | Eyles | .................. | H02G 3/0437 248/72 |

(Continued)

*Primary Examiner* — Robert Sandy
*Assistant Examiner* — Rowland Do
(74) *Attorney, Agent, or Firm* — Edward Langer Adv & Patent Attorney

(57) ABSTRACT

A cable conduit shape holder device, for maintaining the arc of curvature of PVC conduit deployed at corners of building walls during structural construction. The cable conduit shape holder device comprises an arc-shaped, open-sided tubular section having a predetermined length, for externally encapsulating a tubular cable conduit when placed thereon, such that when the section is mounted on a portion of the tubular cable conduit, the section maintains formation of a curved shape in a portion of the tubular cable conduit extending for the predetermined length.

4 Claims, 10 Drawing Sheets

(56) References Cited

U.S. PATENT DOCUMENTS

2013/0343706 A1* 12/2013 Droesbeke ........... G02B 6/4478
385/76
2015/0362095 A1* 12/2015 Notaro .................... H02G 3/32
248/558

* cited by examiner

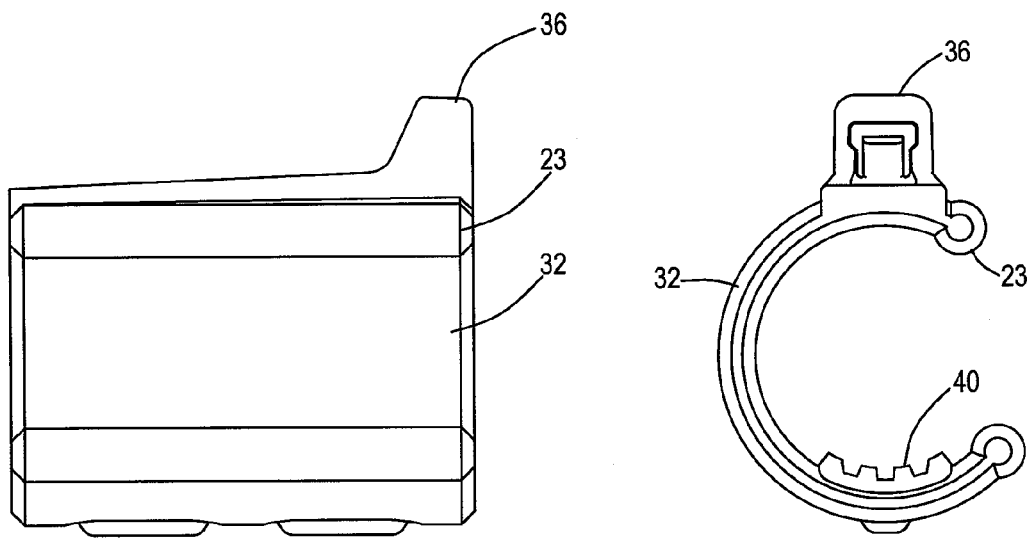
FIG. 4d
FIG. 4e
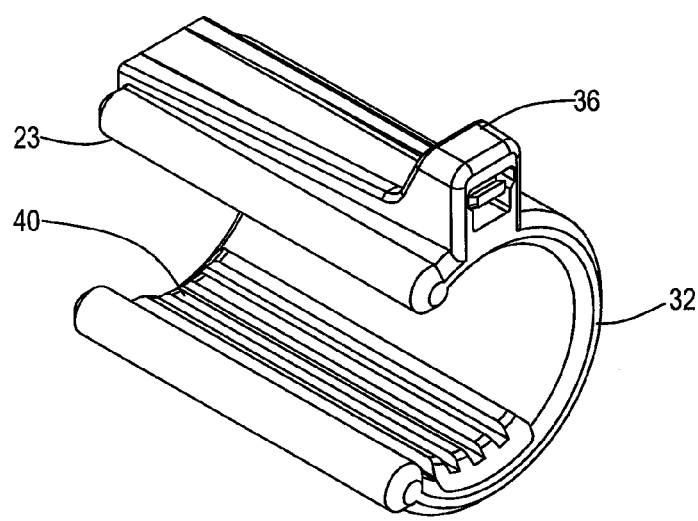
FIG. 4f

CABLE CONDUIT SHAPE HOLDER DEVICE AND METHOD

FIELD OF THE INVENTION

The present invention relates to building and electrical construction materials, including wiring, cable duct, cable ties, cable trays, cable conduit, raceways and PVC conduit for installing wiring in residential and commercial/industrial construction.

BACKGROUND OF THE INVENTION

Electrical systems installed during construction of residential and/or commercial/industrial building require connection of insulated wires which extend between different locations, such as between wall plug-in sockets and circuit breaker panels. Insulated wire may be run in one of several forms of a raceway between electrical devices. This may be a specialized bendable pipe, called a conduit, or one of several varieties of metal (rigid steel or aluminium) or non-metallic polyvinyl chloride (PVC) or high-density polyethylene (HDPE) tubing. Rectangular cross-section metal or PVC wire troughs (North America) or trunking (UK) may be used if many circuits are required. Wires run underground may be run in plastic tubing encased in concrete, but metal elbows may be used at corners of building walls to enable pulling wire around the corners. Wiring in exposed areas, for example factory floors, may be run in cable trays or rectangular raceways having lids.

A problem with electrical construction occurs when PVC conduit is used during structural layout for providing a path for wiring and the conduit is initially placed at corners of building walls, or at a corner between a vertical building wall and the floor, or the ceiling. In most cases, at a later stage after structural layout, electrical wiring installation is performed by an electrician or other construction workers. As shown in prior art FIG. 1a, during the structural layout or at a later stage, an indentation or niche is formed in the wall for initial placement of the PVC conduit. The PVC conduit is shown with a curvature but will not by itself remain with this shape, since it normally rises and reaches an almost straight profile. Therefore, there is a need to retain the curvature for the wire pulling/wire pushing activity associated with wiring installation.

Sometimes the wall niche is provided between support frame elements extending vertically, typically made of metal. A hole is usually formed in the vertical support frame element near the floor at the bottom of the support frame element, for receiving the PVC conduit portion extending from the floor. The PVC conduit upper portion is then placed in the niche, and bent at the corner near the floor, and only later in the construction process is the cable pulled through it.

Typically, the bend or arc of curvature of PVC conduits around the corners of building walls is formed at a tight angle. Sometimes, after having been initially placed at a corner during the structural layout, these conduits are pushed further into the corner during later structural construction by other workmen, such as during flooring installation, plumbing installation, or plasterboard construction. As a result of this pushing, the PVC conduit no longer retains a curvature, and becomes crimped at a sharp angle. There is also the risk of cutting the PVC conduit when it is pushed up against the metal edge in the hole of the support frame element. When the PVC conduit is pushed and crimped or cut as described, it becomes impossible to pull wiring through the PVC conduit around these corners, and also impossible to push wiring ahead through the conduit from an entry point.

Also, there is the risk of an electrical fault if the PVC conduit is cut and the metal frame element comes into contact with the wiring in the conduit.

FIG. 1b (prior art) illustrates this problem at a building corner with a bent PVC conduit. The bent shape restricts the movement of wiring pushed or pulled through it.

Sometimes, cement is poured to seal the PVC conduit at the corner of the wall near the floor, and before the cement dries and becomes hardened, it is necessary to retain the shape of the PVC conduit, by using weights to immobilize it. Here again, the formation of a sharp bend or angle in the PVC conduit causes problems.

Therefore, it would be desirable to provide a solution to the problem of cable conduit crimping and distortion at bends and corners of structural construction.

SUMMARY OF THE INVENTION

Accordingly, it is a principal object of the present invention to overcome the disadvantages associated with the use of PVC conduit during structural construction, where the PVC conduit becomes bent and cannot be used for wiring installation.

In accordance with a preferred embodiment of the present invention, there is provided a cable conduit shape holder device, for maintaining the arc of curvature of PVC conduit deployed at corners of building walls during structural construction.

In accordance with a preferred embodiment of the present invention, there is provided a cable conduit shape holder device comprising:
  an arc-shaped, open-sided tubular section having a predetermined length, for externally encapsulating a tubular cable conduit when placed thereon,
  such that when said section is mounted on a portion of said tubular cable conduit, said section maintains formation of a curved shape in a portion of said tubular cable conduit extending for said predetermined length.

In an alternative embodiment, there is provided a cable conduit shape holder device comprising:
  an arc-shaped, open-sided tubular fastener having a predetermined length, for externally encapsulating a tubular cable conduit when placed thereon,
  said fastener having at least one anchoring point,
  such that when a pair of said fasteners are mounted in spaced apart fashion on a portion of said tubular cable conduit, said fasteners are connectable one to another via a connector extending between the anchoring points of each, said connector having a predetermined length so as to maintain formation of a curved shape in the portion of said tubular cable conduit extending between said fasteners.

In this embodiment, the inventive fastener is shaped as a truncated open-sided tube, having an anchoring point formed as an ear extending from an end of said fastener. The ear is formed with a slot enabling a connector such as a tie string or rope or plastic cable tie or other flexible length to be tied at one end to it, with the other end thereof tied to the other fastener, with the connector having a predetermined length so as to insure formation of a curvature in the tubular cable conduit extending between said fasteners.

Also in a preferred embodiment, each fastener is formed on its interior side with a set of ridges to grip the external side of the cable conduit when mounted thereon.

An additional feature of the inventive fastener is the provision of an interlock tab on the external side of said fastener to enable it to engage an interlock socket formed on an another fastener, so that two adjacent fasteners may be oriented at a designated angle between them, so that the cable conduits extend at a similar angle.

The alternative embodiments for the cable conduit shape holder device insure the formation of an arc of curvature in the cable conduit, thereby alleviating the problem of a tight angle or crimped PVC conduit.

Additional features of the inventive cable conduit shape holder device will become apparent from the following drawings and description.

BRIEF DESCRIPTION OF THE DRAWINGS

FIG. 4b shows a right side perspective view of the fasteners of FIG. 4a;

FIGS. 4d-f show, respectively, side, end and perspective views of the fastener of FIG. 4c.

DETAILED DESCRIPTION OF THE PREFERRED EMBODIMENTS

Figure 1A:
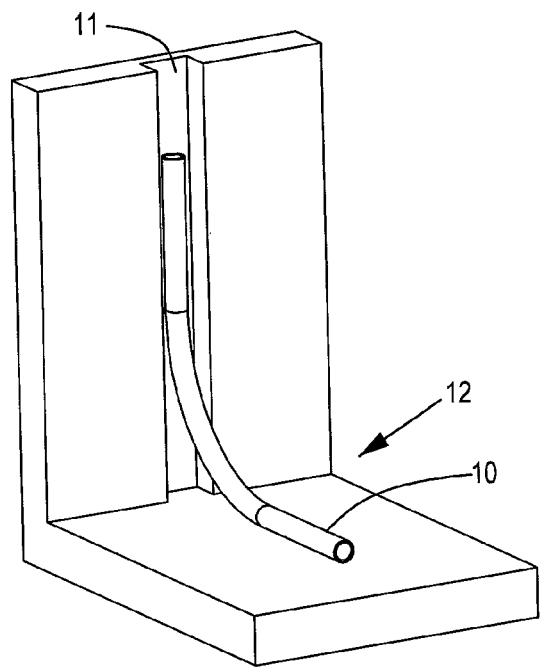
FIGS. 1a-b are, respectively, perspective views of a prior art PVC cable conduit, shown initially bent at a wall corner, and subsequently shown crimped at a sharp angle, thus restricting easy passage of cable pushed or pulled therethrough.
Figure 1B:
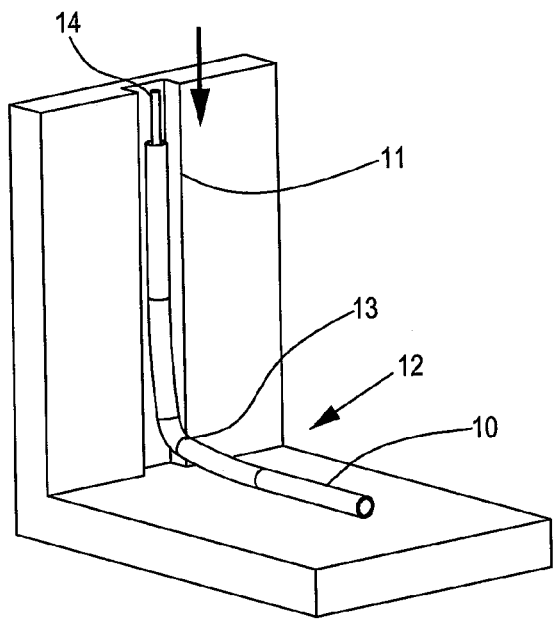

Referring now to prior art FIG. 1a, as stated in the background, in electrical installations associated with building construction, during structural layout, a PVC conduit 10 is placed in a niche 11 in a wall, with a curvature which will allow passage of a cable to be pushed or drawn therethrough. However, as shown in prior art FIG. 1b, typically, the PVC conduit 10 becomes bent at a corner 13 during later structural construction, and this illustrates a common problem encountered by electricians working at a building wall corner 12. The bent shape of the PVC conduit 10 at corner 13 restricts the movement of wiring 14 to be pushed or drawn through it.

Figure 2:
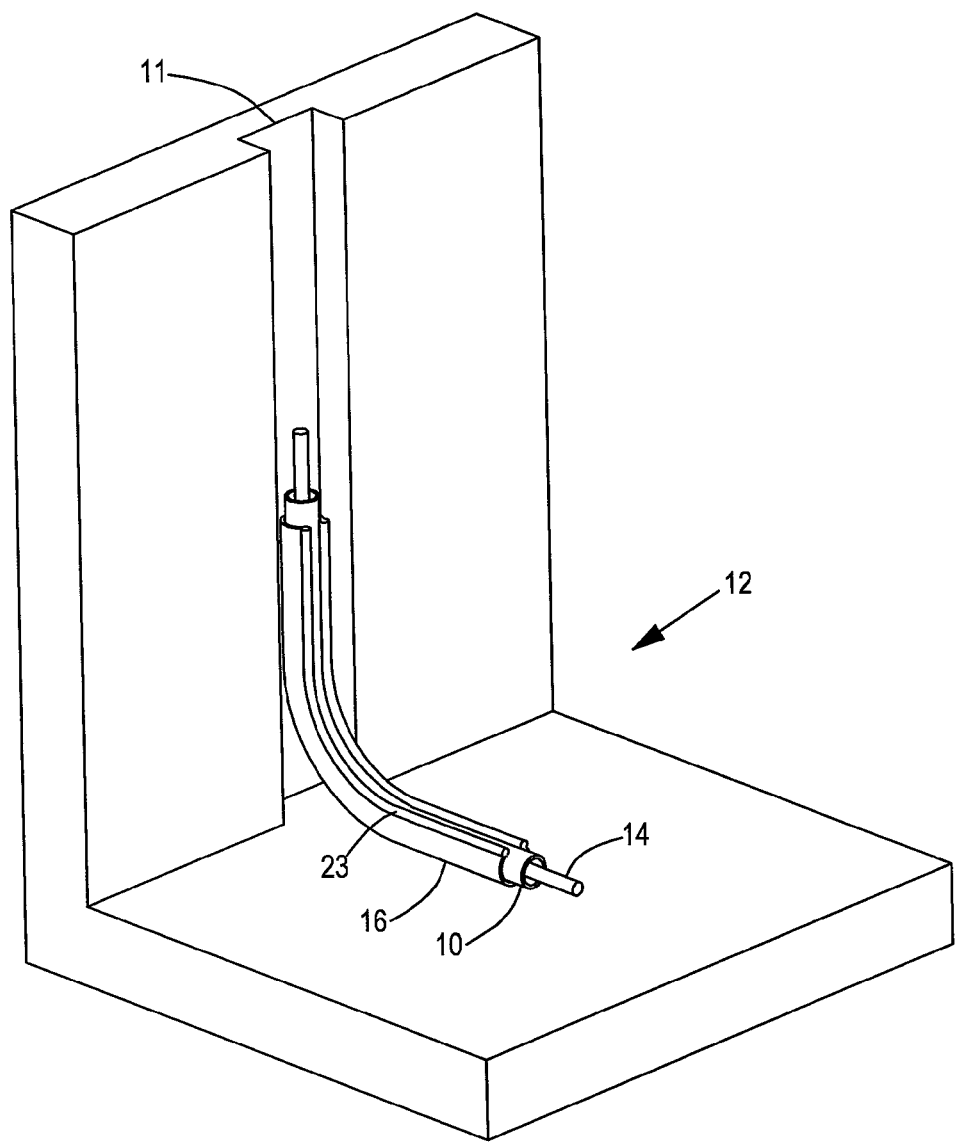
FIG. 2 is a perspective view of an embodiment of a cable conduit shape holder device constructed and installed in accordance with the principles of the present invention.

Referring now to FIG. 2, in accordance with the present invention, there is provided a cable conduit shape holder device 16 which is an arc-shaped, open-sided tubular section having a predetermined length, for externally encapsulating a tubular cable conduit section such as a PVC conduit 10. The cable conduit shape holder device 16 is shown mounted on a portion of the tubular cable conduit 10, and thereby insures formation of a curvature in the portion of the tubular cable conduit extending for the predetermined length. This arrangement insures easy passage of the wiring 14. A rounded edge 23 of device 16 is provided, with the edge 23 being formed with a rounded shape extending as a thickened bead of material along the length of the edge 23, to enable slidable insertion of conduit 10 in easy fashion within device 16, to retain it therein.

Figure 3A:
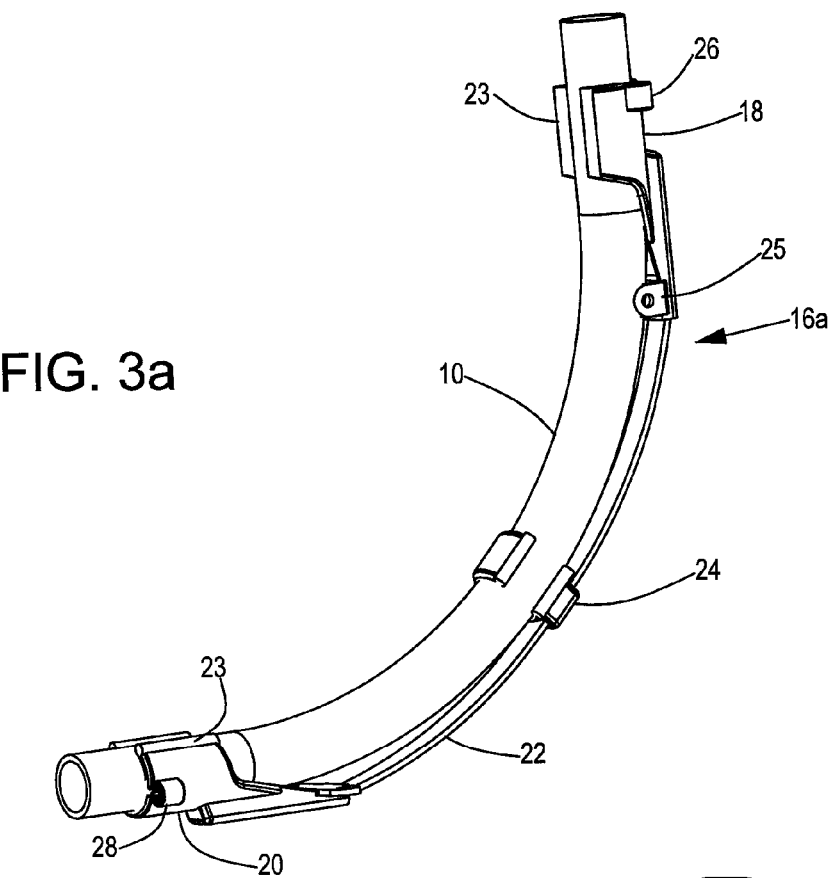
FIG. 3a-b are respectively, front perspective and side views of another cable conduit shape holder device, featuring a pair of fasteners and a connecting brace extending between them.

Referring now to FIG. 3a, there is shown a front perspective view of an alternative embodiment of the cable conduit shape holder device 16 of FIG. 2. This embodiment is indicated as holder device 16a, in which a pair of C-shaped clamp-type fasteners 18, 20 are provided and attached at the ends of a connecting brace 22 extending between them. The C-shaped clamps each have rounded edges 23 to enable slidable insertion of conduit 10 in easy fashion within the clamp, to retain it therein. The connecting brace 22 is shaped to provide the cable conduit 10 section with a curvature between its ends. Another C-shaped clamp fastener 24 is also provided to hold the connecting brace 22 to the cable conduit 10 at mid-section, to insure the proper curvature of the cable conduit 10 within holder device 16a.

Figure 3B:
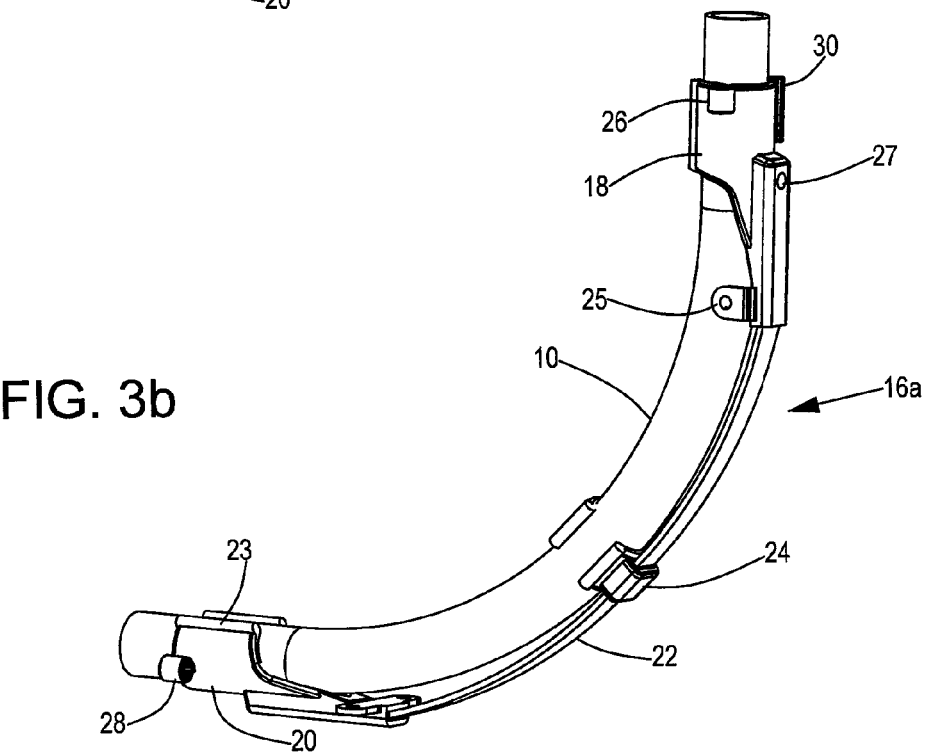

A bendable ear 25 formed at the end of clamp 18 provides an anchor point for optional use to fix clamp 18 on a wall. Hole 27 (see FIG. 3b) also provides this.

Also shown in FIG. 3a there are formed a pair of interlock sockets 26, 28 each attached, respectively, to a side of one of fasteners 18, 20. On the other side of fastener 18 there is formed an interlock tab 30 (visible in FIG. 3b), and on the other side of fastener 20 there is formed another interlock tab 32 (see FIG. 3c). Each of the interlock sockets 26, 28 is designed to engage a corresponding interlock tab 30, 32 when two fasteners are placed adjacent one another (see FIGS. 3c-d).

Figure 3C:
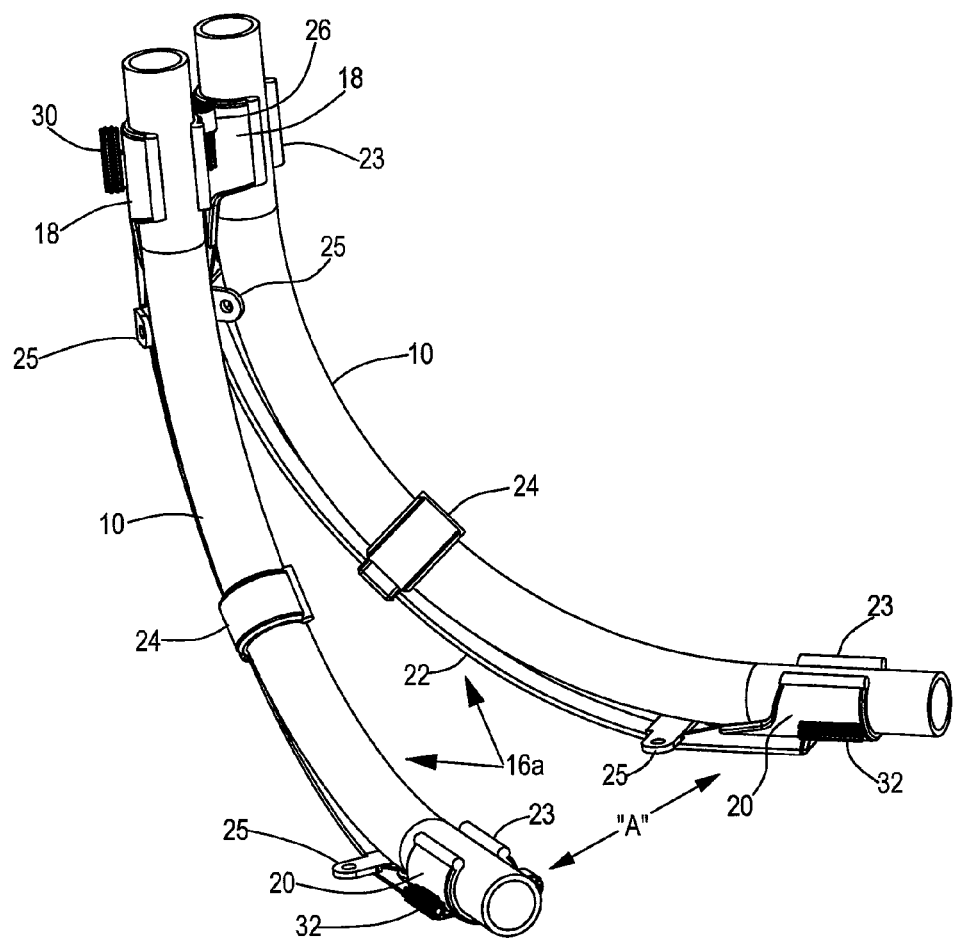
FIG. 3c shows, respectively, a pair of cable conduit shape holder devices engaging one another at one end thereof, determining their orientation at a designated angle between them.

In FIG. 3c, only one section of the device 16a length is shown. Although FIG. 3c shows the interlock tab 32 on the left side of clamp 20 on the lower portion of device 16a, it will be understood that it is possible to use a clamp 18 with the interlock tab 30 on the right side of the clamp 20, to enable connection of additional sections of device 16a length.

Figure 3D:
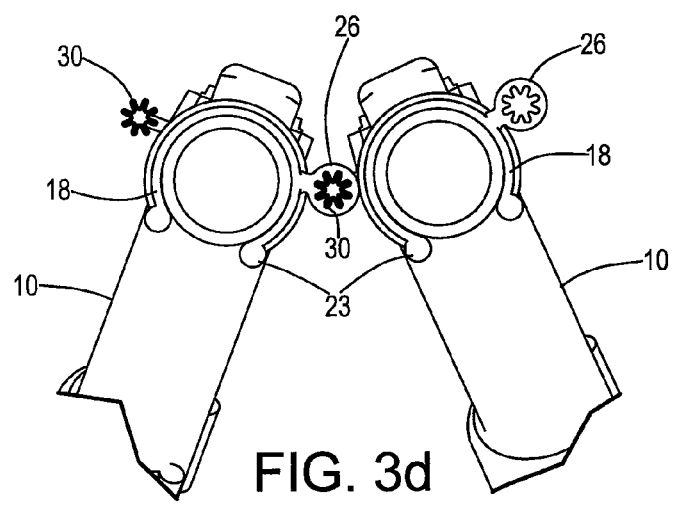
FIG. 3d is a top end view of the pair of cable conduit shape holder devices shown in FIG. 3c.

Referring now to FIG. 3d, there are shown, respectively, a pair of adjacent cable conduit shape holder devices 16a engaging one another at a pair of fasteners 18 each formed at one end of the holder device 16a. The engagement of the holder devices 16a with one another is enabled by the engagement of interlock tab 30 and interlock socket 26 each respectively formed on one of the holder devices 16a, and this engagement determines the orientation of holder devices 16a at a designated angle "A" between them (see FIG. 3c).

In the detailed top end view of FIG. 3d, the engagement of the pair of fasteners 18 in adjacent holder devices 16a is shown, which is enabled by engagement of an interlock tab 30 and an interlock socket 26. The formation of the interlock tab 30 with a star configuration makes it possible to engage interlock socket 26 at different selected angles, which provides holder devices 16 with a large measure of installation flexibility to meet a particular wiring layout and set of construction requirements.

Figure 3E:
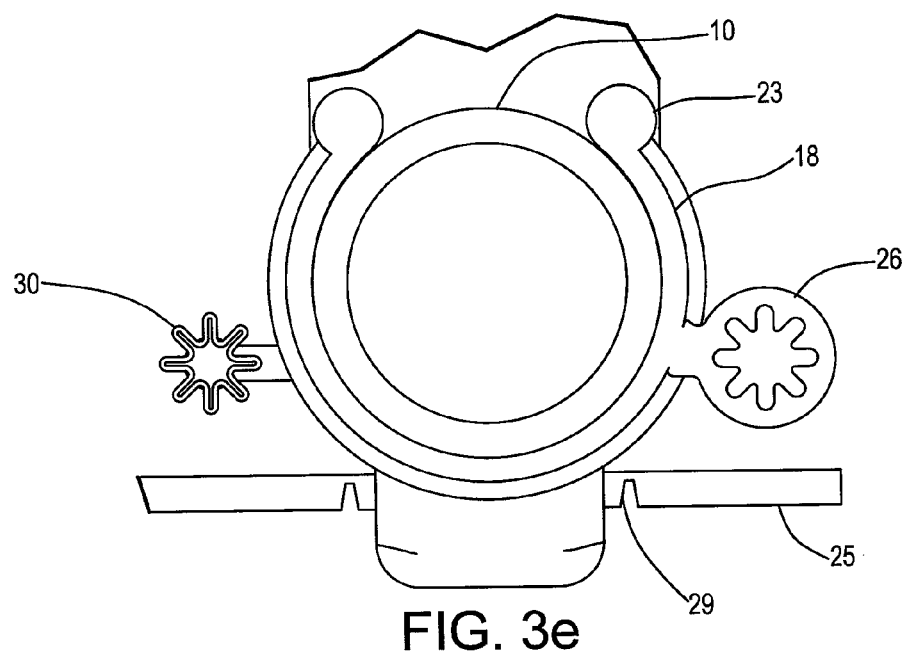
FIGS. 3e-f show, respectively, end and perspective views of a fastener, showing a detailed view of the interlock tab and socket formed on the fastener sides.
Figure 3F:
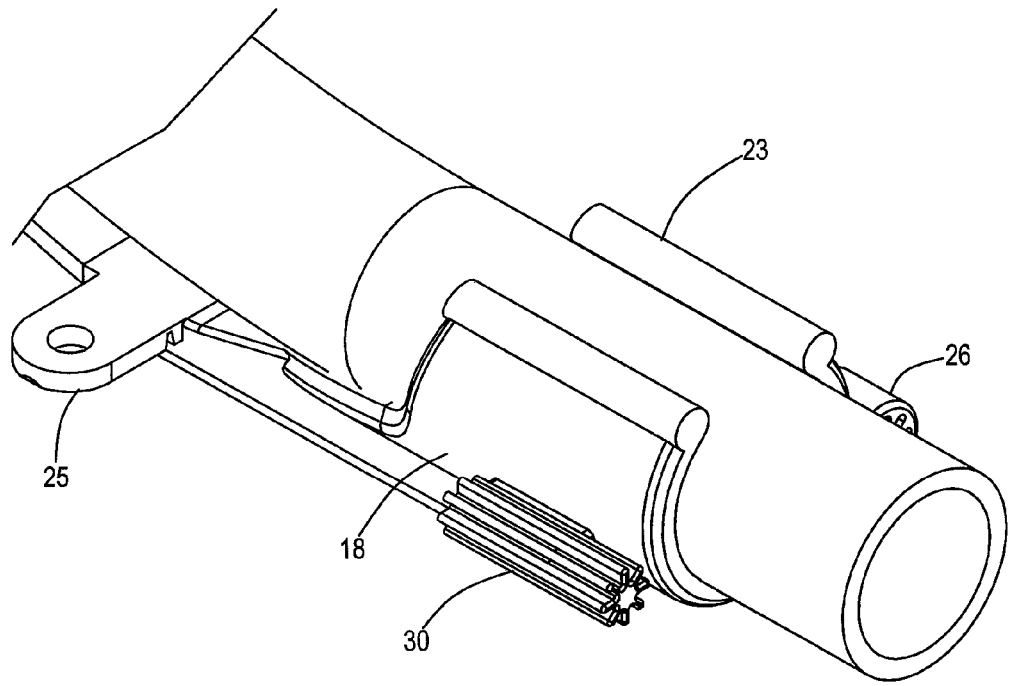

Referring now to FIGS. 3e-f there are shown, respectively, end and perspective views of a fastener 18 (viewed reverse from FIG. 3d), showing a detailed view of the interlock tab 30 and interlock socket 26 formed on the sides of fastener 18. FIG. 3e shows a niche 29 formed in bendable ear 25 to provide flexibility.

Figure 3G:
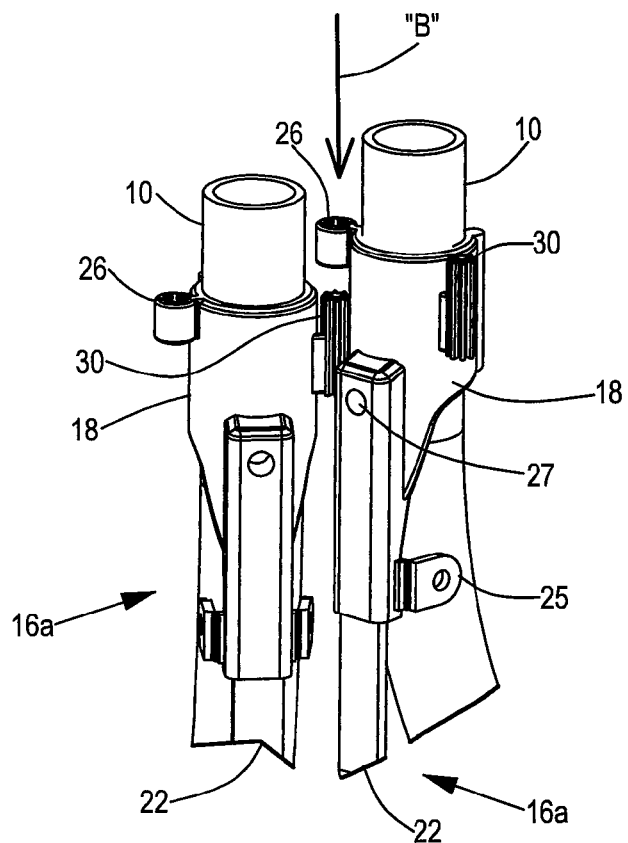
FIGS. 3g-h show, respectively, a pair of cable conduit shape holder devices featuring a pair of fasteners prior to interlocking and after engagement.
Figure 3H:
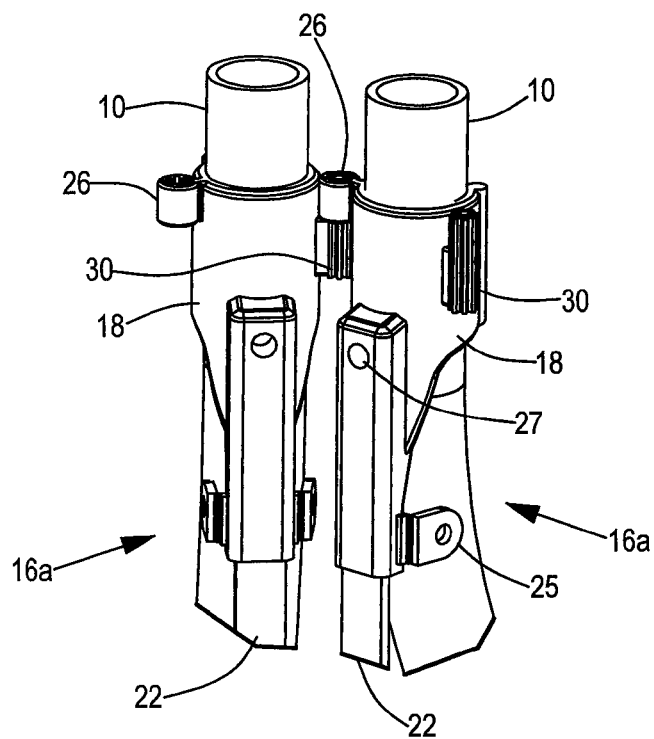

Referring now to FIGS. 3g-h there are shown, respectively, a pair of cable conduit shape holder devices 16a featuring a pair of fasteners 18 prior to interlocking and after engagement. In FIG. 3g, the two fasteners 18 are placed adjacent to one another, such that an interlock socket 26 is placed over and above interlock tab 30. By rotation of one fastener 18 with respect to the other, the orientation between them can be adjusted. The particular angle "A" (see FIG. 3c) chosen between the fasteners 18 is dependent on this orientation. Once this is established, the fasteners 18 can become engaged and interlocked by downward movement of fastener 18 as illustrated by arrow "B", as shown. The star configuration of the interlock tab 30 and socket 26 enables the orientation adjustment.

Figure 4A:
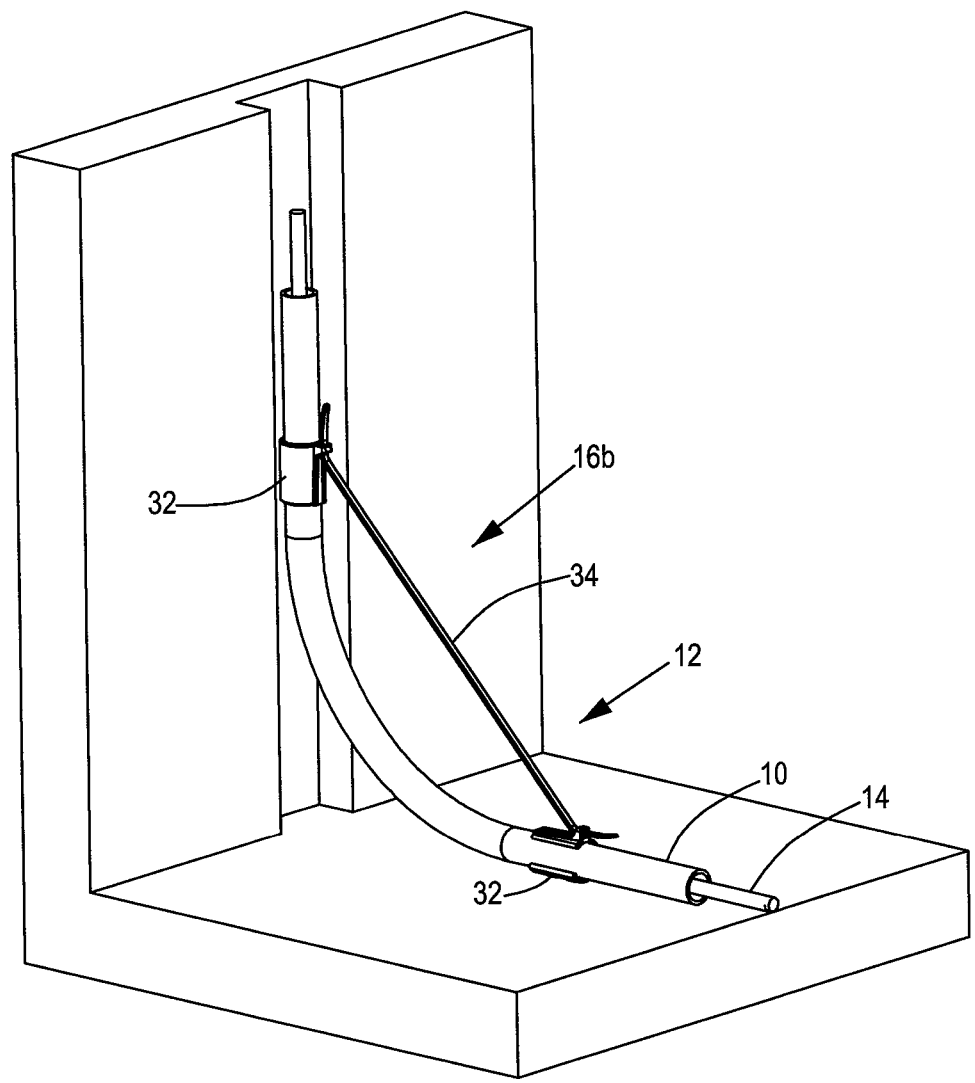
FIG. 4a shows a left side perspective view of another embodiment of the inventive cable conduit shape holder device, featuring a pair of fasteners connected by a flexible length extending between them so as to insure formation of a curvature.

Referring now to FIG. 4a, there is shown a left side perspective view of another embodiment of the inventive cable conduit shape holder device 16, indicated here as device 16b, featuring a pair of fasteners 32 spaced apart and mounted on cable conduit 10, with the fasteners 32 connected one to the other by a flexible length 34 extending between them so as to insure formation of a curvature in the cable conduit 10.

Figure 4B:
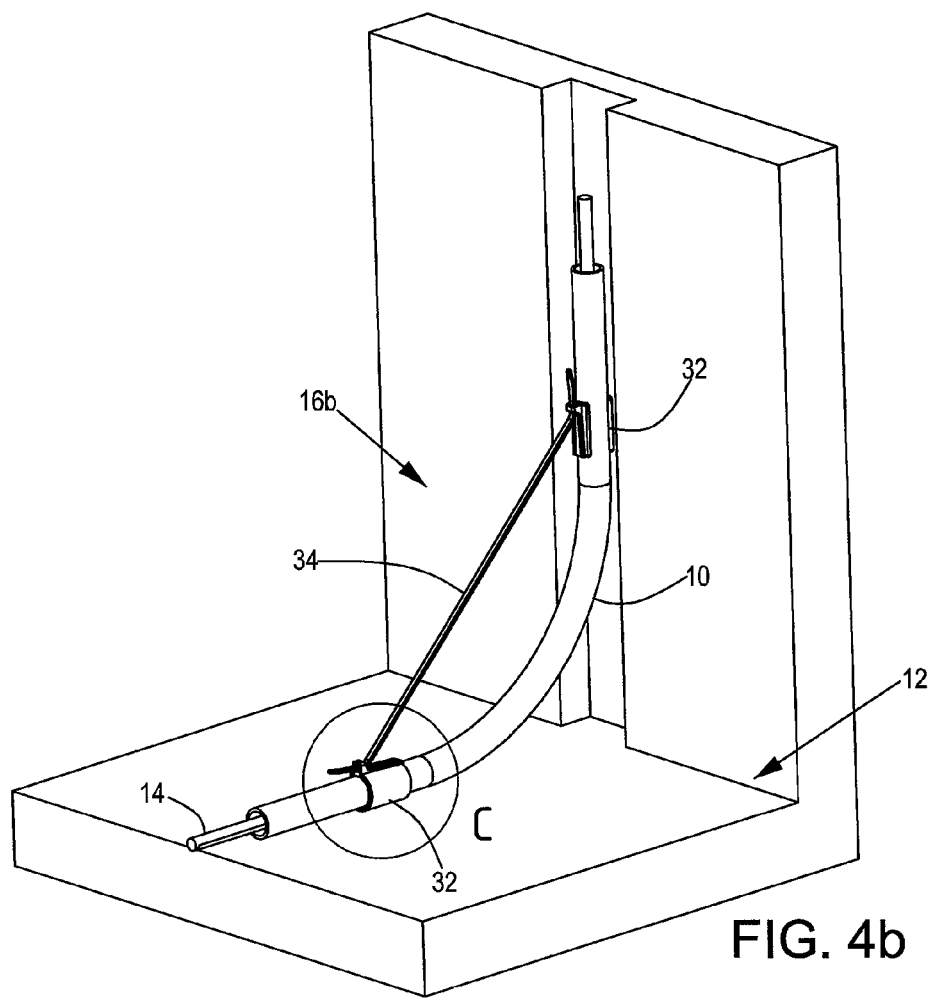

FIG. 4b shows a right side perspective view of the holder device 16b, showing fasteners 32 of FIG. 4a.

Figure 4C:
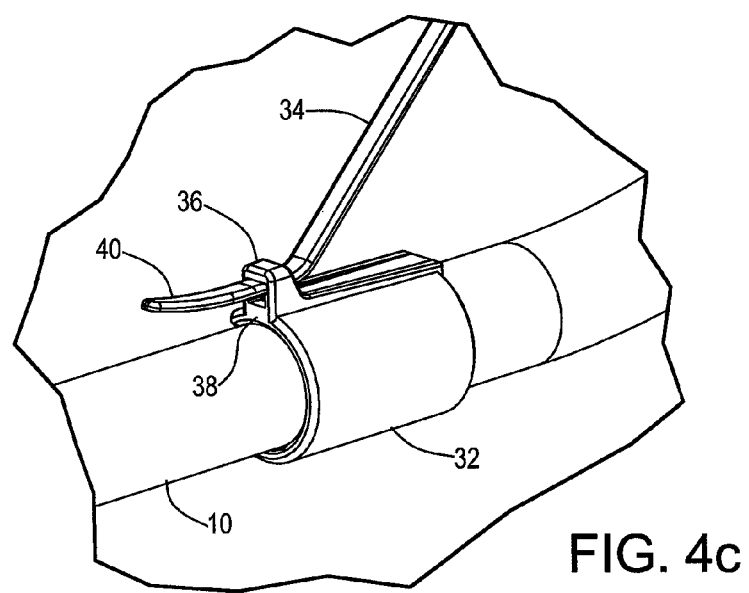
FIG. 4c shows a detailed view of a fastener having an anchoring point for the flexible length.

FIG. 4c shows a detailed view of a fastener 32 having an anchoring point 36 for the flexible length 34.

The flexible length 34 may be provided by a plastic strap designed with etched teeth formed along its length. As can be seen in the detailed view of FIG. 4c, the strap is designed to engage fastener 32 at an anchoring point 36 of fastener 32. A tongue and groove device 38 is formed at anchoring point 36, such that when the strap end 40 is inserted through the groove, the tongue engages and locks against the teeth formed in the strap 34. These plastic straps are also known as cable ties, and are used to bundle cables together to form a trunk of individual cables.

When cement is poured over the PVC conduit and it hardens, the cable ties can be removed.

Referring now to FIGS. 4d-f there are shown, respectively, side, end and perspective views of fastener 32 of FIG. 4a. Additional features of construction are visible, including rounded edges 23 and /ribs 40 formed within the interior portion of the length of fastener 32, for providing a better grip on the cable conduit 10.

Figure 5:
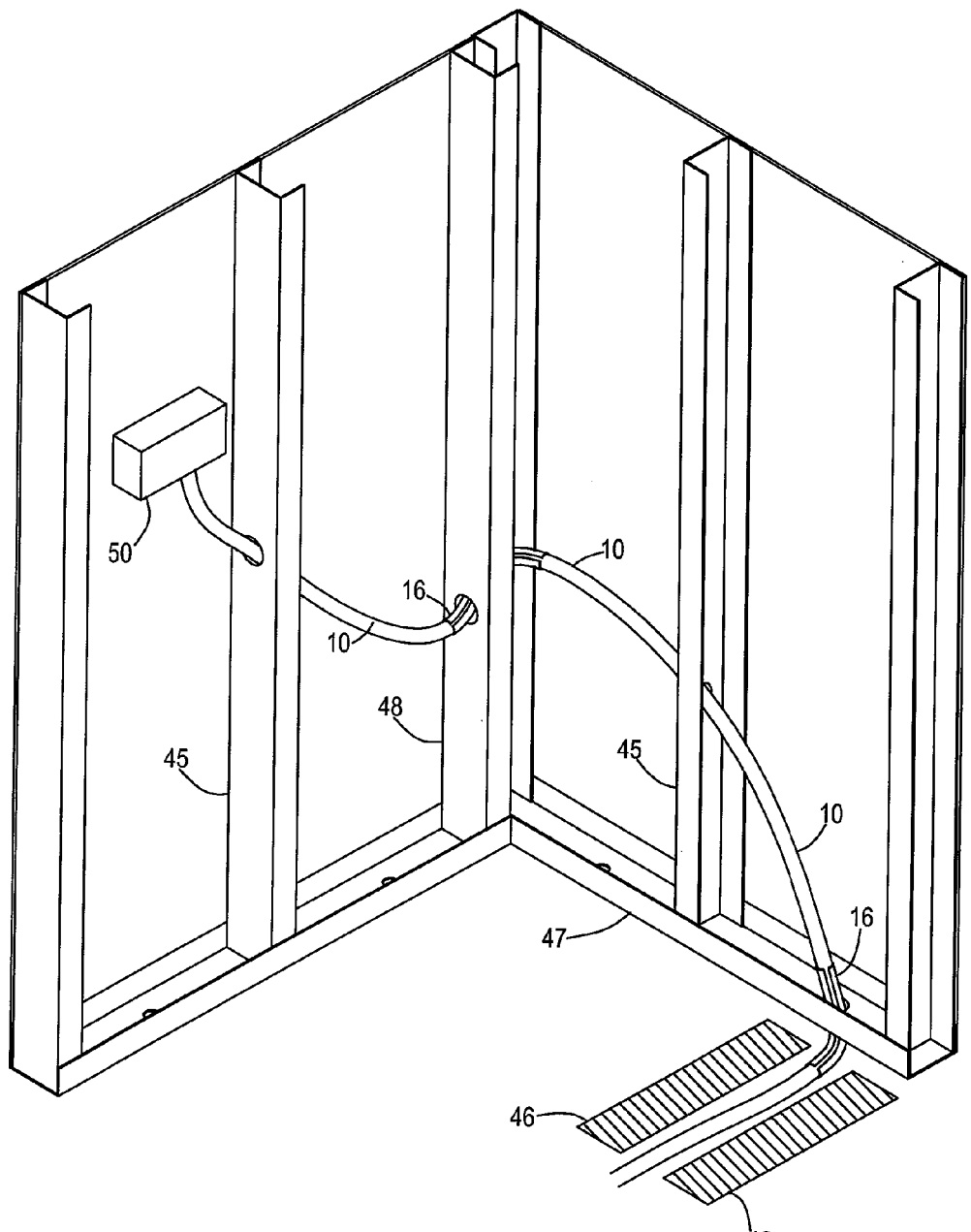
FIG. 5 shows the inventive cable conduit shape holder device used in an electrical installation, in which cable conduit passes between metal frame elements.

Referring now to FIG. 5, there is shown inventive cable conduit shape holder device 16 used in an electrical installation, in which PVC cable conduit 10 passes between metal frame elements 45 which are used to provide structural support. In some installations, the PVC conduit runs from beneath floor tiles 46, through a hole formed in base frame element 47. Once it has been re-oriented at the base frame element 47 to bend upwards, the PVC conduit extends through the holes formed in metal frame elements 45, and is again re-oriented to bend at the hole in wall corner frame element 48, and then extends to reach the junction box 50 mounted on the wall.

In the prior art of such electrical installations, where the PVC conduit 10 was directed to bend at a corner, it was subject to cutting by the metal edges of the hole formed in the frame elements 45, 47 and 48. Using the cable conduit shape holder device 16 of the present invention, this is prevented by the thickness of device 16.

Where the PVC conduit 10 runs through a metal frame element directly without being bent, the use of a straight portion of cable conduit shape holder device 16 is optional.

While the present invention has been described with regard to certain specific embodiments thereof, it is to be understood that the description is not meant to be a limitation, as further modifications will now become apparent to those skilled in the art, and it is intended to cover such variations as fall within the scope of protection provided by the appended claims.

I claim:

1. A shape holder device for PVC cable conduits comprising:
    an arc-shaped, open-sided tubular section having a predetermined length and rigidity, for externally encapsulating and retaining therein a tubular PVC cable conduit portion when placed over said PVC cable conduit portion,
    wherein a portion of said open-sided tubular section is truncated and shaped as at least a pair of C-shaped clamp-type fasteners each provided at an opposite end of said tubular section which is provided with a curvature between its ends, said C-shaped clamp-type fasteners comprising a pair of oppositely-facing edges, each edge formed with a rounded shape extending as a thickened bead of material along the length of said edge, said pair of rounded edges enabling said open-sided tubular section to easily slide over said tubular PVC cable conduit portion in resilient fashion, to retain it therein,
    such that when said tubular section is mounted on said PVC cable conduit portion, said tubular section ensures formation of a curvature in said tubular PVC cable conduit portion extending at least for said predetermined length of said tubular section.

2. The device of claim 1 wherein said tubular section is provided with a thickness sufficient to avoid damage to said encapsulated tubular PVC cable conduit portion in a wiring installation.

3. The device of claim 2 wherein at least one metal frame element in said wiring installation has a hole formed therein for passage of said tubular PVC cable conduit portion therethrough, wherein edges of said hole are in contact with said tubular section, preventing cutting of said PVC cable conduit portion.

4. A method of holding the shape of PVC cable conduits, said method comprising:
    providing an arc-shaped, open-sided tubular section having a predetermined length and rigidity, for externally encapsulating and retaining therein a tubular PVC cable conduit portion when placed over said PVC cable conduit portion,
    wherein a portion of said open-sided tubular section is truncated and shaped as at least a pair of C-shaped clamp-type fasteners each provided at an opposite end of said tubular section which is provided with a curvature between its ends, said C-shaped clamp-type fasteners comprising a pair of oppositely-facing edges, each edge formed with a rounded shape extending as a thickened bead of material along the length of said edge, said pair of rounded edges enabling said open-sided tubular section to easily slide over said tubular PVC cable conduit portion, to retain it therein, placing said open-sided tubular section over said PVC cable conduit portion, such that when said tubular section is mounted on said PVC cable conduit portion, said tubular section ensures formation of a curvature in said tubular PVC cable conduit portion extending at least for said predetermined length of said tubular section.

\* \* \* \* \*